United States Patent
Buseth et al.

(10) Patent No.: US 8,268,280 B2
(45) Date of Patent: Sep. 18, 2012

(54) METHOD FOR PRODUCTION OF CALCIUM COMPOUNDS

(75) Inventors: Torfinn Buseth, Kristiansand S (NO); Einar Andersen, Kristiansand S (NO)

(73) Assignee: Elkem Solar AS, Oslo (NO)

( * ) Notice: Subject to any disclaimer, the term of this patent is extended or adjusted under 35 U.S.C. 154(b) by 23 days.

(21) Appl. No.: 12/744,803

(22) PCT Filed: Jan. 7, 2009

(86) PCT No.: PCT/NO2009/000005
§ 371 (c)(1),
(2), (4) Date: May 26, 2010

(87) PCT Pub. No.: WO2009/096795
PCT Pub. Date: Aug. 6, 2009

(65) Prior Publication Data
US 2010/0303707 A1    Dec. 2, 2010

(30) Foreign Application Priority Data

Jan. 30, 2008   (NO) .................................. 20080569

(51) Int. Cl.
| | | |
|---|---|---|
| *C01F 11/18* | (2006.01) | |
| *C01F 11/06* | (2006.01) | |
| *C01F 11/24* | (2006.01) | |
| *C01B 25/00* | (2006.01) | |
| *C01B 35/00* | (2006.01) | |
| *C01B 13/18* | (2006.01) | |
| *C01B 13/36* | (2006.01) | |
| *C01G 49/10* | (2006.01) | |

(52) U.S. Cl. ........ 423/430; 423/276; 423/279; 423/280; 423/289; 423/292; 423/304; 423/317; 423/321.1; 423/432; 423/493; 423/497; 423/635; 423/636; 423/637; 423/658.5

(58) Field of Classification Search .................. 423/276, 423/279, 280, 289, 292, 304, 317, 321.1, 423/430, 432, 493, 497, 635, 636, 637, 658.5
See application file for complete search history.

(56) References Cited

U.S. PATENT DOCUMENTS
4,272,498 A * 6/1981 Faatz ....................... 423/243.09

FOREIGN PATENT DOCUMENTS
| | | |
|---|---|---|
| JP | 2005095785 A | 4/2005 |
| KR | 20070109201 Y | 11/2007 |
| RU | 2046757 Y | 10/1995 |
| SU | 649652 A | 2/1979 |
| WO | 0034182 A | 6/2000 |
| WO | 2006134915 Y | 12/2006 |

OTHER PUBLICATIONS

Thistleton, J. et al. "Mechanisms of chemical phosphorus removal II. Iron (III) salts". Trans IChemE. 2002. vol. 80, Part B, pp. 265-269, Institution of Chemical Engineers, GB.
Poon, C.S. et al. "The use of ferric chloride and anionic polymer in the chemically assisted primary sedimentation process". Chemosphere. 1999, vol. 39, No. 10, pp. 1573-1582, Elsevier Science Ltd. HK.

* cited by examiner

*Primary Examiner* — Daniel C McCracken
*Assistant Examiner* — Daniel Berns
(74) *Attorney, Agent, or Firm* — Lucas & Mercanti, LLP

(57) ABSTRACT

The present invention relates to a method for production of calcium compounds having very low content of phosphorus and boron from an impure calcium chloride, solution containing phosphorus and boron, which method comprises the following steps: a) addition of a FeCl3-solution to the calcium chloride solution, b) adjusting the pH of the solution by addition of a base to between 3 and 9.5 for precipitation of iron hydroxide, iron phosphate and boron compounds, c) removal of the solid precipitate from the solution in step b) obtaining a purified calcium chloride solution, d) precipitation of a calcium compound from the solution from step c), and e) separation of the calcium compound from the solution in step d).

10 Claims, No Drawings

METHOD FOR PRODUCTION OF CALCIUM COMPOUNDS

This application is a 371 of PCT/NO2009/000005 filed Jan. 7, 2009, which in turn claims the priority of NO 20080569 filed Jan. 30, 2008, the priority of both applications is hereby claimed and both applications are incorporated by reference herein.

TECHNICAL FIELD

The present invention relates to a method for production of calcium compounds having a low boron and phosphorus content.

TECHNICAL BACKGROUND

In refining of metallurgical grade silicon for production of solar grade silicon it is known to remove boron from molten silicon by treatment of molten silicon with calcium-silicate based slag. In order to remove boron from molten silicon to obtain an acceptable low content of boron in the silicon it is necessary to use a slag having a being very low boron content.

Slag treatment of silicon for boron removal also has effect on the phosphorus content in the silicon as the distribution coefficient between phosphorus in the slag and in molten silicon is very low and in the range of 0.1 to 0.3. If calcium-silicate based slag used for removal of boron from molten silicon has a high phosphorus content, the phosphorus content in the silicon may thus increase during the slag treatment process. The phosphorus content in silicon grade silicon should be lower than 3 ppmw and it is therefore important to use a calcium-silicate based slag with a lowest possible phosphorus content during the slag treatment for removal of boron.

When producing calcium-silicate based slag from a source of calcium and $SiO_2$, it is difficult to find a source of calcium having a sufficiently low content of phosphorus in order to produce calcium compounds with a sufficiently low phosphorus content. In addition most sources of calcium have a low, but notifyable boron content.

From WO 03/097528 it is known a method for removing of phosphorus from calcium-silicate based slag where low price sources of $CaCO_3$ and $SiO_2$ can be used to produce the slag. By the method of WO 03/097528 calcium-silicate based slag is treated with a molten ferrosilicon alloy whereby phosphorus in the calcium-silicate based slag is transferred to the ferrosilicon alloy whereafter calcium-silicate based slag with a low phosphorus content is removed from the molten ferrosilicon alloy.

By the method of WO 03/097528 it is, however, not possible to remove boron from the slag. The boron content of the calcium-silicate based slag is thus directly dependent on the boron content of the raw materials used to produce the calcium-silicate based slag. In addition the method disclosed in WO 03/097528 is costly as it is performed at high temperatures, resulting in high energy consumption.

It is thus a need to produce calcium compounds for use as a raw material for production of calcium-silicate based slag having both a very low phosphorus content and a very low boron content.

By the present invention it has now been found a simple method whereby phosphorus can be substantially removed from a source a calcium and where also the boron content can be reduced.

DESCRIPTION OF THE INVENTION

The present invention thus relates to a method for production of calcium compounds having very low content of phosphorus and boron from an impure calcium chloride solution containing phosphorus and boron, which method comprises the following steps:

a) addition of a $FeCl_3$-solution to the calcium chloride solution,
b) adjusting the pH of the solution by addition of a base to between 3 and 9.5 for precipitation of iron hydroxide, iron phosphate and boron compounds from the calcium chloride solution,
c) removal of the solid precipitate from the solution in step b) obtaining a purified calcium chloride solution,
d) precipitation of a calcium compound from the solution from step c), and
e) separation of the calcium compound from the solution in step d).

The impure calcium chloride solution is preferably produced by dissolving a calcium carbonate source in hydrochloric acid. Impure calcium chloride solutions from other chemical processes can also be used.

According to a preferred embodiment the pH in step b) is adjusted to a value between 7 and 8.5.

It has surprisingly been found that addition of trivalent iron chloride to the impure calcium chloride solution results in a substantially improved precipitation of phosphorus compounds and boron compounds from the calcium chloride solution. It is believed that the iron hydroxide precipitation that is easy to filter, will contain iron phosphate and boron compounds, which improves removal of phosphorus from the chloride solution and also results in that a substantial part of the boron in the solution follows the iron oxide precipitate.

The precipitate from step b) can be removed from the calcium chloride solution in conventional ways such as by settling and filtration or by a combination of these. In order to ensure an even better separation of the precipitate from the calcium chloride solution, flocculation agents such as polyacrylates, polyacrylamides or natural polymers such as cellulose can be added.

Precipitation of the calcium compound from the purified calcium chloride solution from step c) can be done in a number of ways. According to one embodiment calcium carbonate be precipitated by addition of $CO_2$-gas and a base, such as $NH_3$ to the solution.

According to another embodiment calcium hydroxide can be precipitated from the calcium chloride solution by addition of NaOH in order to increase the pH value of the solution.

It is also possible to precipitate calcium hydroxide and calcium carbonate by simultaneous addition of $CO_2$-gas and NaOH to the calcium chloride solution.

According to a third embodiment calcium sulfate is precipitated by addition of sulfuric acid to the calcium chloride solution.

According to a fourth embodiment oxalate acid, $H_2C_2O_4$, is added to the calcium chloride solution for precipitation of calcium oxalate, $CaC_2O_4H_2O$.

The precipitated calcium compound can either be used directly for production of a calcium-silicate-based slag or it can be calcined in conventional way at conventional temperature for production of CaO. Calcining of the precipitated calcium compounds can also be done in situ during production of calcium-silicate-based slag in a suitable slag production furnace.

By the method of the present invention it can from a calcium carbonate source containing 64 ppmw phosphorous, be produced CaO containing less than 1 ppmw phosphorous. At the same time it is obtained a substantial reduction in the boron content.

DETAILED DESCRIPTION OF THE INVENTION

Example 1

750 gram of shell limestone ($CaCO_3$) was dissolved in 3 liters solution of hydrochloric acid. The shell limestone contained 243 ppmw phosphorous and 19 ppmw boron. A non-dissolved part of 37.1 gram was removed from the produced calcium chloride solution by filtration. The calcium chloride solution contained 64 mg/l phosphorous and 4.1 mg/l boron.

30 ml of a $FeCl_3$-solution was added to 3 liters of the calcium chloride solution and the pH in the calcium chloride solution was adjusted to 8.0 by addition of $NH_3$ whereby iron hydroxide and iron phosphate were precipitated together with boron compounds.

The purified $CaCl_2$-solution contained less than 1 ppmw phosphorous and 3 ppmw boron.

To 200 ml of the purified $CaCl_2$-solution it was added a 33% NaOH solution whereby calcium hydroxide was precipitated. The precipitated calcium hydroxide contained less than 1 ppmw phosphorous and 3 ppmw boron. The content of phosphorous was thus reduced from 64 mg/l in the impure $CaCl_2$-solution to less than 1 ppmw meaning that more than 98% of phosphorous was removed, while the boron content was reduced from 4.1 mg/l to 3 ppmw, meaning that about 25% of the boron was removed.

The precipitated calcium hydroxide was thereafter calcined to CaO in conventional way.

This example shows that an extremely high removal of phosphorous is obtained by the method according to the present invention. In addition a part of the boron is also removed.

Example 2

125 g of limestone ($CaCO_3$) was dissolved in 228 HCl and water was added to a volume of 500 ml for production of a $CaCl_2$-solution. The limestone contained 13 ppmw phosphorous and about 0.5 ppmw phosphorous and about 0.5 ppmw boron.

Undissolved material was filtrated from the uncleaned $CaCl_2$-solution.

1.56 ml of a $FeCl_3$-solution was added to the $CaCl_2$-solution under stirring. pH in the calcium chloride solution was thereafter adjusted to 6.9 by addition of $NH_3$ whereby iron hydroxide and iron phosphate together with a smaller part of boron compounds were precipitated. The precipitate could easily be separated from the calcium chloride solution by filtration.

$CaCO_3$ was thereafter precipitated from the purified $CaCl_2$-solution by bubbling $CO_2$ through the solution under simultaneous addition of $NH_3$. The precipitated $CaCO_3$ was dried and calcined at 900° C. for production of pure CaO. The produced CaO contained 1.5 ppmw phosphorous and less than 0.5 ppmw boron.

Example 3

625 g limestone ($CaCO_3$) was dissolved in 1140 ml HCl and water was added to a volume of 1500 ml for production of a $CaCl_2$-solution. The limestone contained 13 ppmw phosphorous and 0.5 ppma boron.

Undissolved material was removed from the impure $CaCl_2$-solution by filtration.

3.12 ml of a $FeCl_3$-solution was added to the $CaCl_2$-solution. pH in the calcium chloride solution was thereafter adjusted to 7.3 by addition of $NH_3$ whereby iron hydroxide, iron phosphate and a smaller part of boron compounds were precipitated. The precipitate could easily be removed from the calcium chloride solution by filtration.

$CaCO_3$ was thereafter precipitated from the purified $CaCl_2$-solution by bubbling $CO_2$ through the solution while the pH was kept between 7.0 and 7.5 by addition of $NH_3$. The precipitated $CaCO_3$ was dried and calcined at 900° C. to produce pure CaO. The produced CaO contained less than 0.7 ppmw phosphorous and less than 0.5 ppmw boron.

Examples 2 and 3 confirm the very high degree of phosphorous removal that is obtained also from $CaCl_2$-solution containing substantial less phosphorous than the solution in Example 1 and that lime containing less than 1 ppmw phosphorous can be produced. When it comes to boron also Examples 2 and 3 show that some removal of boron is obtained, but as the impure solutions already had a very low content of boron, as low as about 0.5 ppmw, the removal of boron was difficult to analyse.

The invention claimed is:

1. A method for production of calcium compounds having very low content of phosphorus and boron from an impure calcium chloride solution containing phosphorus and boron, wherein the method comprises the following steps:
   a) adding a $FeCl_3$-solution to the impure calcium chloride solution;
   b) adjusting the pH of the resulting solution from step a) by addition of a base to between 3 and 9.5 for precipitation of iron hydroxide, iron phosphate and boron compounds;
   c) removing a solid precipitate of iron hydroxide, iron phosphate and boron compounds from the solution resulting from step b);
   d) precipitating a calcium compound from the resulting solution from step c); and
   e) separating the calcium compound from the solution resulting from step d), the calcium compound with very low phosphorus and boron content.

2. The method according to claim 1, wherein the impure calcium chloride solution is produced by dissolving a calcium carbonate source in hydrochloric acid.

3. The method according to claim 1, wherein the impure calcium chloride solution is waste solutions from chemical processes.

4. The method according to claim 1, wherein the pH in step b) is adjusted to a value between 7 and 8.5.

5. The method according to claim 1, wherein a flocculation agent is added to the impure calcium chloride solution in step b).

6. The method according to claim 1, wherein calcium carbonate is precipitated in step d) by addition of $CO_2$-gas and $NH_3$ to the solution resulting from step c).

7. Method according to claim 1, characterized in that calcium hydroxide is precipitated in step d) by addition of NaOH to the solution from step c).

8. Method according to claim 1, characterized in that calcium sulfate is precipitated in step d) by addition of sulfuric acid to the solution from step c).

9. Method according to claim 1, characterized in that calcium oxalate is precipitated in step d) by addition of oxalic acid to the solution from c).

10. The method according to claim 1, wherein the calcium compound from step e) is calcined to CaO.

* * * * *